United States Patent
Yamauchi et al.

[11] Patent Number: 5,927,244
[45] Date of Patent: Jul. 27, 1999

[54] COMBUSTION CHAMBER STRUCTURE HAVING PISTON CAVITY

[75] Inventors: Toyosei Yamauchi, Tachikawa; Koji Morikawa, Higashikurume, both of Japan

[73] Assignee: Fuji Jukogyo Kabushiki Kaisha, Tokyo, Japan

[21] Appl. No.: 08/948,066

[22] Filed: Oct. 9, 1997

[30] Foreign Application Priority Data

Oct. 31, 1996 [JP] Japan ................................ 8-290935

[51] Int. Cl.⁶ .................. F02B 17/00; F02F 3/28
[52] U.S. Cl. ................. 123/295; 123/298; 123/305; 123/307; 123/309
[58] Field of Search .................. 123/295, 298, 123/305, 301, 307, 309, 279, 260

[56] References Cited

U.S. PATENT DOCUMENTS

| | | | |
|---|---|---|---|
| 4,920,937 | 5/1990 | Sasaki et al. | 123/305 |
| 4,958,604 | 9/1990 | Hashimoto | 123/305 |
| 5,335,635 | 8/1994 | Kadoi et al. | 123/295 |
| 5,727,520 | 3/1998 | Wirth et al. | 123/305 |
| 5,746,171 | 5/1998 | Yoita | 123/298 |

FOREIGN PATENT DOCUMENTS

| | | | |
|---|---|---|---|
| 216387 | 10/1957 | Australia | 123/295 |
| 87-02415 | 4/1987 | WIPO | 123/305 |

*Primary Examiner*—Erick R. Solis
*Attorney, Agent, or Firm*—Smith, Gambrell & Russell; Beveridge, DeGrandi, Weilacher & Young Intellectual Property Group

[57] ABSTRACT

An internal combustion engine having a cylinder head body with a pentroof-shaped combustion chamber comprises a piston including a piston cavity and a caldera-shaped protrusion provided around the piston cavity, a fuel injector for injecting fuel downward to the piston cavity and a spark plug disposed obliquely in proximity to an intake valve. The piston cavity is provided on the top surface of the piston being offset on the spark plug side. Further, the caldera-shaped protrusion is slanted towards the spark plug side. Therefore, injected fuel collides against a down-slope of the piston cavity and is diffused partly towards the spark plug and partly towards the cylinder head. As a result, a locally rich air-fuel mixture is formed around the spark plug so as to enable stratified charge combustion.

11 Claims, 7 Drawing Sheets

COMBUSTION CHAMBER STRUCTURE HAVING PISTON CAVITY

BACKGROUND OF THE INVENTION

1. Field of the Invention

The present invention relates to the structure of a combustion chamber for an in-cylinder direct fuel injection type spark ignition engine and particularly to the structure of a combustion chamber suitable for stratified charge combustion.

2. Prior Arts

Many approaches have been proposed to improve fuel economy of vehicles and in particular an improvement of theoretical thermal efficiency, a reduction of pumping loss, a reduction of friction and the like have been proposed to raise fuel economy of an engine. To improve the theoretical thermal efficiency or to reduce the pumping loss, there are various approaches for accomplishing a lean burn control, a high EGR rate combustion and the like, besides conventional approaches such as raising a compression ratio or an expansion ratio. In making these approaches, miscellaneous gas flow control techniques such as so-called tumble, swirl or squish are essential to improve the combustion of mixture gas in cylinders.

These gas flow controls have been used originally for raising the combustion velocity and forming a homogeneous mixture gas in cylinders but on the other hand the flow control is purposely used for forming a locally rich mixture zone or forming a mixture gas in a particular area while the mixture gas remains in a lean condition as a whole. In this case, the combustion strategy is categorized in so-called stratified charge combustion but not in homogeneous charge combustion.

In order to realize stratified charge combustion more efficiently by making use of the flow control method, an in-cylinder fuel injection engine in which fuel is injected directly into cylinders is very effective.

For example, Japanese Patent Application Laid-open Toku-Kai-Hei No. 5-1544 discloses a technique in which a masking wall provided around the intake valve generates an inverse tumble flow forcedly so as to carry the fuel injected obliquely from the fuel injection means provided beneath the intake port on the tumble flow to a spark plug disposed in the center of the cylinder head.

Further, Japanese Patent Application Laid-open Toku-Kai-Hei No. 6-146886 discloses a combustion chamber in which the fuel injection means are disposed beneath the intake port in the same way as in Toku-Kai-Hei No. 5-1544 and the intake port has a sectional configuration with one half side thereof expanded. Due to this configuration with one half side expanded, the main stream of intake air is biased toward the cylinder wall, thereby the generation of the inverse tumble flow is fostered. Fuel injected obliquely with respect to the cylinder axis is carried on the inverse tumble flow.

Furthermore, Japanese Patent Application Laid-open Toku-Kai-Hei No. 6-42352 proposes a combustion chamber technique wherein the fuel injection means is disposed in the center of the cylinder head with the injection nozzle directed downward and the spark plug is projected from between two intake ports.

However, the technique disclosed in Toku-Kai-Hei No. 5-1544 has a problem of power shortage at high speeds and high load areas because of the masking wall provided around the intake valve.

Further, the combustion chamber disclosed in Toku-Kai-Hei No. 6-146886 has a defect that since the inverse tumble flow is formed only in one half portion of the combustion chamber and only the concave portion provided on the top surface of the piston forms a combustion space, the compression ratio becomes very high in a limited area of the combustion chamber. Hence, the engine must be designed so as to adjust to running on gasoline with high octane rating.

Further, according to this combustion chamber, since the distance between the injector nozzle and the electrode of the spark plug is so large that it is difficult to control the local air-fuel ratio in the vicinity of the electrode and this causes an unstable combustion and a low ignitability.

Further, according to above two disclosures, because fuel is injected obliquely with respect to the cylinder axis, there is anther problem that fuel sticks to the inner wall of the cylinder. Fuel sticking may exacerbate fuel economy due to excess cooling of the cylinder wall.

Further, the stuck fuel strips lubrication oil from the inner wall of the cylinder and this results in a poor lubrication between the piston and the cylinder.

Further, in the combustion chamber according to Toku-Kai-Hei No. 6-42352, the spark plug is disposed in the center of the cylinder head with the electrode oriented directly downward. Further, the electrode of the spark plug is arranged so as to expose to the fuel sprayed from the fuel injection means. Therefore, this arrangement is aimed at igniting the end portion of injected fuel, then gathering the rich mixture to the center of the combustion chamber and completing combustion therein, rather than igniting fuel reflected on the top surface of the piston.

However, this combustion chamber has a problem that a good stratified charge combustion can be obtained in the condition where the amount of fuel injection is small but it is difficult to suppress the generation of smoke in the condition where the amount of fuel injection is increasing.

SUMMARY OF THE INVENTION

Accordingly, the present invention is intended to obviate the aforementioned disadvantages and problems of the prior arts and it is an object of the present invention to provide a combustion chamber structure of an in-cylinder fuel injection engine capable of securing a stable stratified charge combustion in low and medium speeds engine operating conditions.

To achieve the object, the present invention comprises:

- a pentroof-shaped combustion chamber provided on a lower surface of the cylinder head;
- a fuel injector disposed in the cylinder head at a position offset from the center axis of the cylinder on the exhaust valve side with its injection nozzle oriented downwards so as to inject fuel from upward to downward;
- a spark plug disposed obliquely with respect to the axis of the cylinder in the cylinder head in proximity of the intake valve;
- a ring-shaped protrusion provided on the top surface of the piston with its center offset from the axis of the cylinder on the exhaust valve side and slanted on the spark plug side;
- a concave portion provided on the top surface of the piston inside of the ring-shaped protrusion and offset from the center axis of the fuel injector on the spark plug side; and
- an electrode of the spark plug projected into the concave portion when the piston is almost at top dead center.

DETAILED DESCRIPTION OF THE INVENTION

Figure 1:
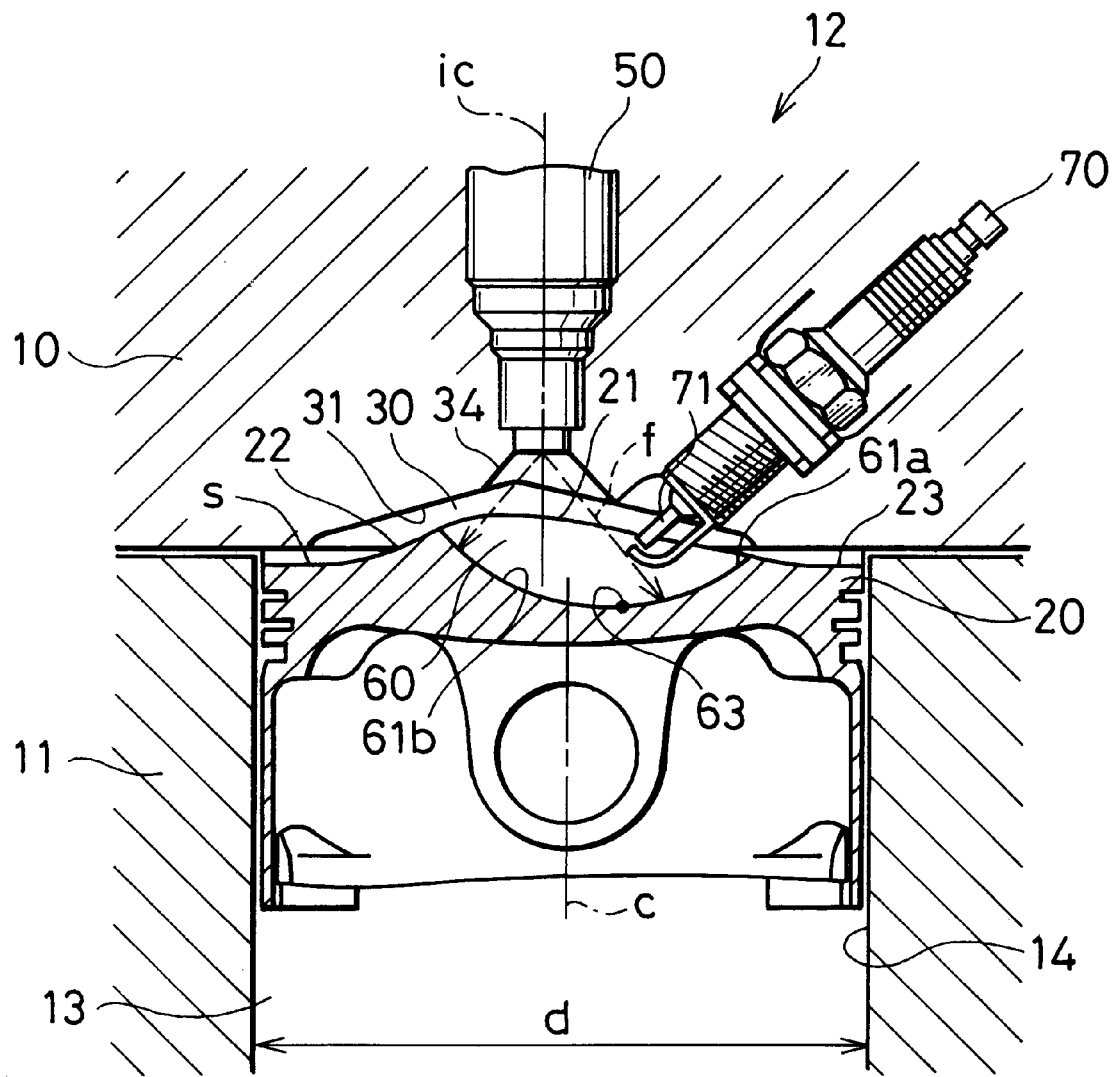
FIG. 1 is a cross-sectional side view showing a combustion chamber of an in-cylinder fuel injection engine according to a first embodiment of the present invention.

Referring now to FIG. 1, numeral 12 denotes an in-cylinder fuel injection engine according to the present invention and numerals 10 and 13 denote a cylinder head and a cylinder, respectively. In the cylinder 13, a piston 20 reciprocating vertically is slidably mounted. Further, in the cylinder head 10, there are provided with a fuel injector 50 as a fuel injection means and a spark plug 70 as an igniting means, respectively. Further, the piston 20 has a cavity 60 on the top surface thereof.

Figure 2:
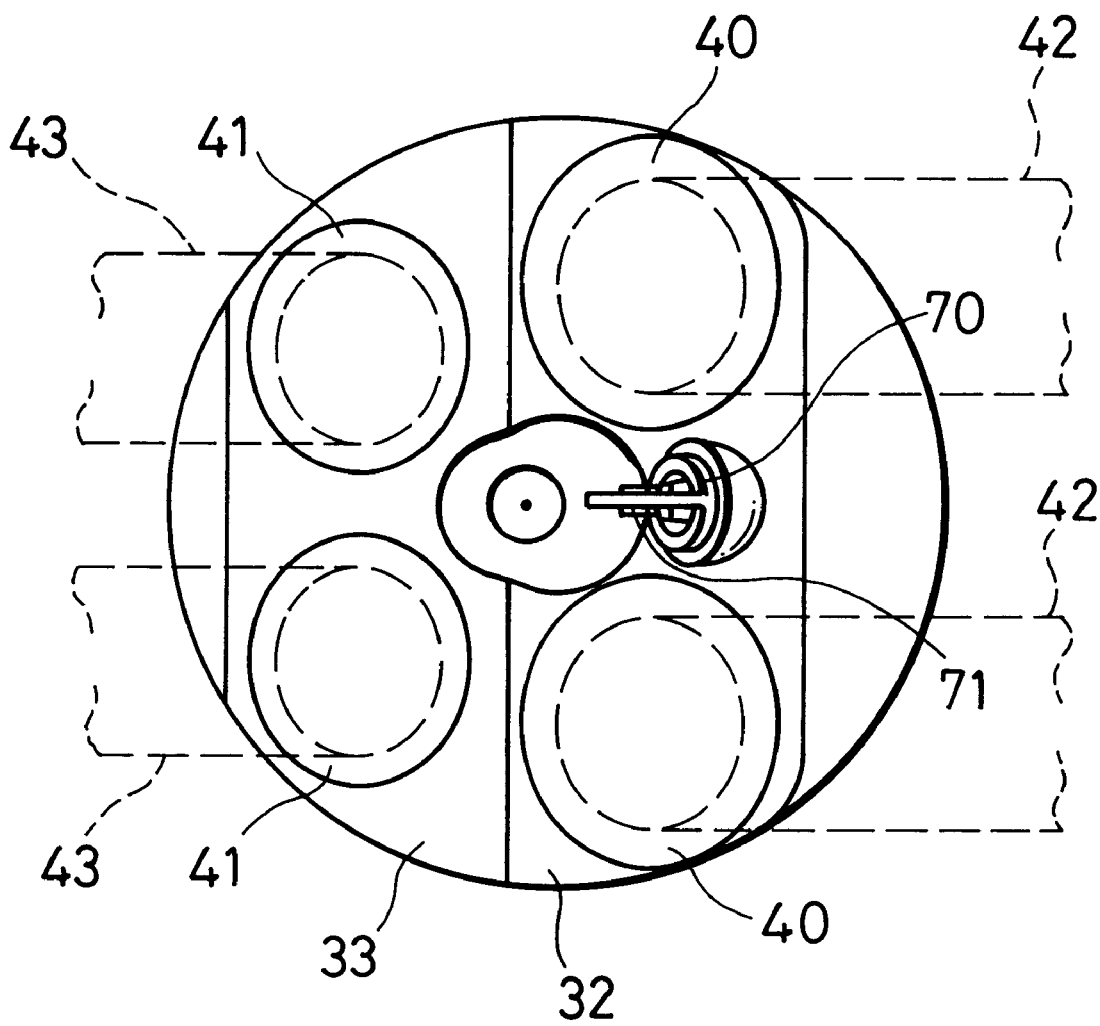
FIG. 2 is a bottom view showing an inner wall of a cylinder head according to a first embodiment of the present invention.

A combustion chamber 30 is formed between the piston 20 and the cylinder head 10 and a ceiling portion 31 which is provided on the cylinder head 10 side is configured into so-called pentroof type formed by two inclined faces 32 and 33 opposed to each other, as shown in FIG. 2. Further, two intake valves 40 are mounted on one inclined face 32 to draw air through intake ports 42 into the combustion chamber 30 and two exhaust valves 41 are mounted on the other inclined face 33 to discharge burned gas through exhaust ports 43 out of the combustion chamber 30.

The intake ports 42 is so designed as to generate a weak tumble flow of gas in the normal direction within the cylinder 13 when the intake valves 40 are opened during suction stroke. The tumble rate is established to be 0.5 to 2.0 in this embodiment.

In the ceiling portion 31 of the cylinder head 10, as shown in FIG. 1, a trumpet-shaped bore 34 is provided around a vertical axis ic and the fuel injector 50 is mounted above that bore 34 on the same axis ic so as to inject a fuel f into the combustion chamber 30. The axis ic is is offset on the exhaust valve 41 side from the cylinder axis c.

Therefore, the fuel f is injected in an approximate hollow cone-shaped fuel spray formed around the injection center ic downward in the vertical direction. The hollow cone-shaped fuel spray has a solid angle of around 40 to 80 degrees and specifically its shape is formed by giving a rotational movement to the fuel by means of the fuel injector 50 using a swirl nozzle.

The spark plug 70 is, as shown in FIG. 1 and FIG. 2, disposed in the cylinder head 10 obliquely with respect to the cylinder axis c with its electrode 71 projected into the cavity 60 from between the intake valves. Further, the electrode 71 is arranged in such a position as not exposed to the injected fuel f.

Further, as shown in FIG. 1 and FIG. 2, the piston 20 has a top surface 21 so configured as to agree with the configuration of the ceiling portion 31. That is to say, the top surface 21 is composed of a plane portion 23 and a foot portion 22 having a rising slope gradually increasing its inclination angle or grade as the rising slope becomes high.

Therefore, because of this configuration, a squish space s is formed in an area where the plane portion 23 mates with the cylinder head 10 when the piston 20 is positioned near top dead center.

Figure 3:
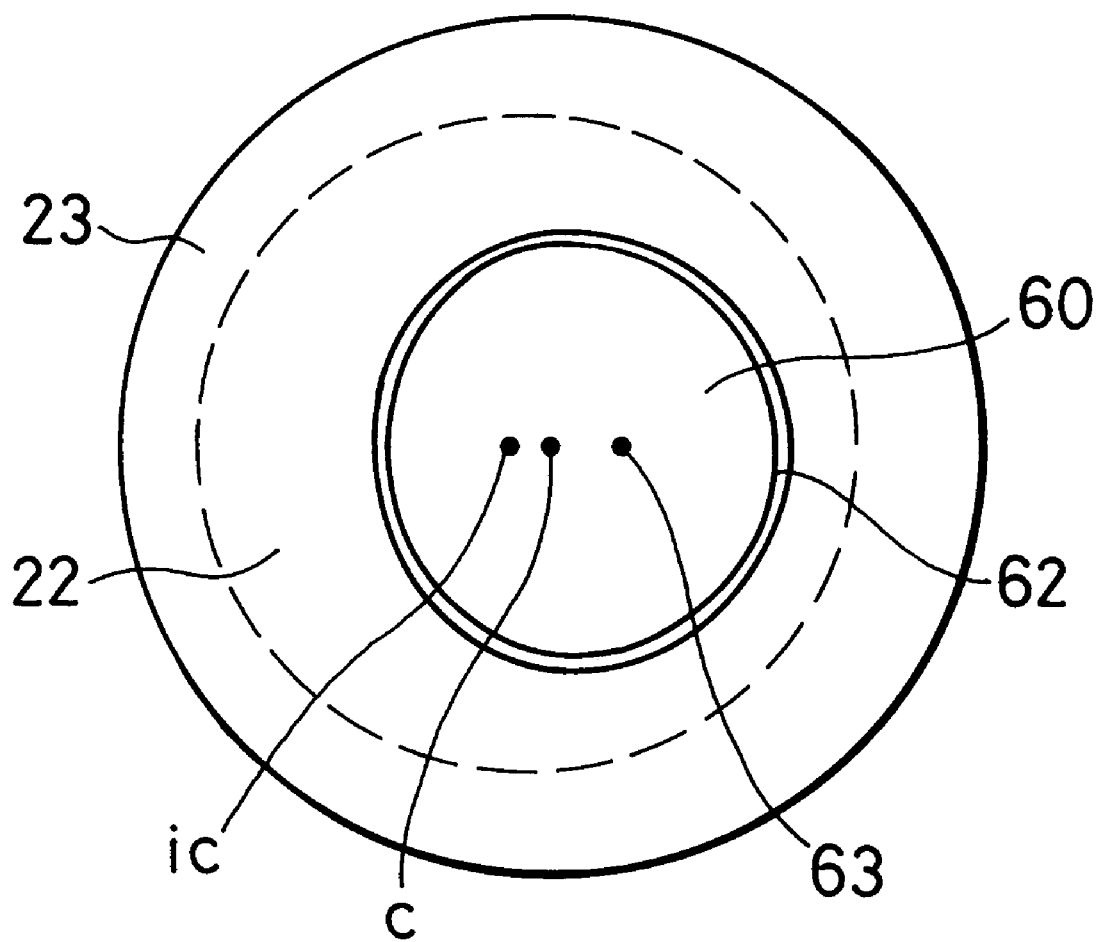
FIG. 3 is a top view of the piston according to a second embodiment of the present invention.

Next, describing the configuration of the cavity 60 provided on the top surface 21 of the piston 20, as shown in FIG. 1 and FIG. 3, the cavity 60 is shaped into a single spherical surface of which center is situated above the top surface 21 and is offset from the fuel injection center axis ic on the spark plug 70 side. A ring-shaped protrusion 62 is formed on the boundary between the cavity and the rising slope. When viewed from above, the ring-shaped protrusion 62 has an approximate oval-shaped configuration. Further, the ring-shaped protrusion 62 is offset on the spark plug 70 and slanted towards the spark plug 70.

The pass length across the oval-shaped protrusion 62 in the direction from the intake valves 40 to the exhaust valves 41 is established to be around 50 percent of a bored of the cylinder 13. Further, a deepest portion 63 of the cavity 61 is offset on the spark plug 70 side from the cylinder axis c and the depth from the plane portion 23 to the deepest portion 63 is established to be around 15 percent of the bore d of the cylinder 13.

Further, when the piston 20 is positioned near top dead center as shown in FIG. 1, the electrode 71 is disposed so as to dip into the cavity 61. Further, the fuel injector 50 injects fuel in such a way that the sprayed fuel stays within the cavity 60 of the piston 20 in a specified position.

Describing an operation and effect of thus constituted in-cylinder fuel injection engine, the engine is designed so as to perform stratified charge combustion in low and medium load operating conditions and to perform homogeneous charge combustion and therefore the fuel injection amount, fuel injection timing and ignition timing are so controlled. In this specification document, since the feature of the present invention lies in the combustion at a low and medium load area, the description of the homogeneous charge combustion at a high load area will be omitted.

First, when the piston 20 rises to a specified position immediately before the compression stroke is finished, the fuel f is injected from the fuel injector 50 into the cavity 60 of the piston 20 in a hollow cone-shape. Because the center of the cavity 60 is offset on the spark plug 70 side, the majority of the injected fuel f collides obliquely against a spherical surface portion 61b on the exhaust valve side 41. Hereinafter, this spherical surface portion 61b is referred to as "fuel colliding surface".

Therefore, the hollow cone-shape of the fuel f collapses and the fuel f is diffused by the effects of reflecting, crawling and jumping. The reflected or jumping fuel f is partly oriented towards the spark plug 70 and partly towards the inclined face 32 of the ceiling portion 31 with injection energy retained.

The portion of the fuel oriented to the inclined face 32 is further reflected thereon and diffused towards the center of the combustion chamber 30. On the other hand, the rising piston 20 produces a squish flow along the foot portion 22 from the squish space s towards the center of the combustion chamber. That is to say, the squish has an effect of preventing the fuel f from diffusing in the direction of the inner wall 14 of the cylinder 13.

Further, the fuel f diffused in the cavity 60 is carried on a weak tumble flow and guided to the spark plug 70 side and as a result the formation of broken pieces of mixture gas or excessively lean mixture which hinders flame propagation can be prevented.

That is to say, a locally rich ignitable mixture gas is formed around the electrode 71 in an overall lean mixture condition.

When thus formed rich mixture gas is ignited at a specified ignition timing, the mixture gas is burned fast in the lean mixture condition and a stratified charge combustion is completed.

Further, due to the existence of the inclined faces 32 and 33 of the ceiling portion 31, the weak tumble flow is maintained without being disturbed even under compression stroke.

Those miscellaneous operations described above effectuate the stratified charge combustion performed under low and medium load condition, thereby this enabling elimination of hydrocarbons and nitrogen oxides, a good driveability and fuel economy.

Further, this type of the combustion chamber which is composed of the cavity 60 and the pentroof type ceiling portion 31 has so wide range of the compression ratio that the engine can be designed so as to be operated on regular gasoline.

Furthermore, since the sprayed fuel hardly diffuses towards the cylinder wall 14 side due to the direction of fuel injection and the piston cavity 20, a part of the fuel f is prevented from being stuck to the cylinder wall. The stuck fuel generally exacerbates combustion and lubrication between the cylinder and the piston.

Figure 4:
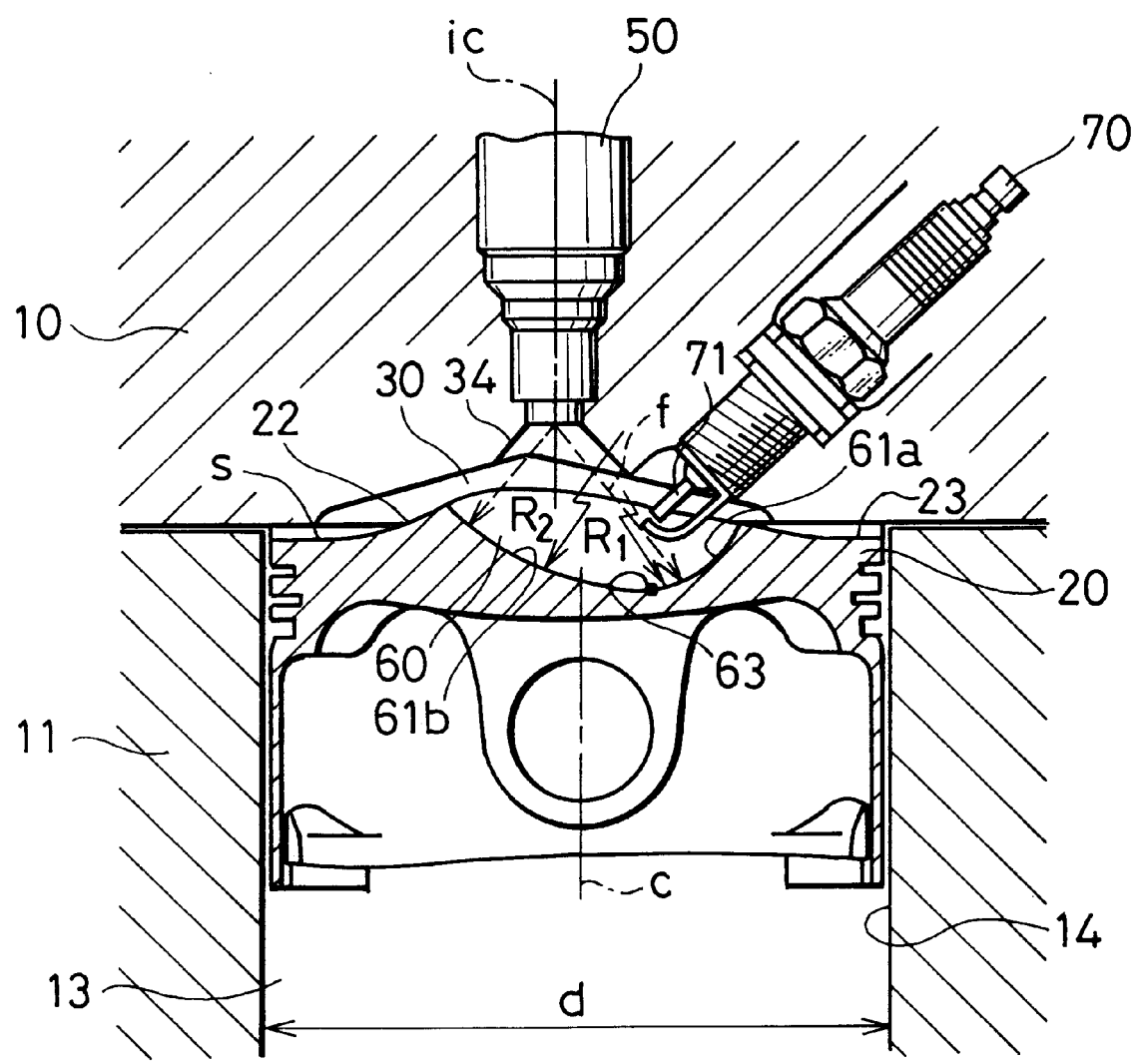
FIG. 4 is a cross-sectional side view of a combustion chamber according to a second embodiment of the present invention.
Figure 5:
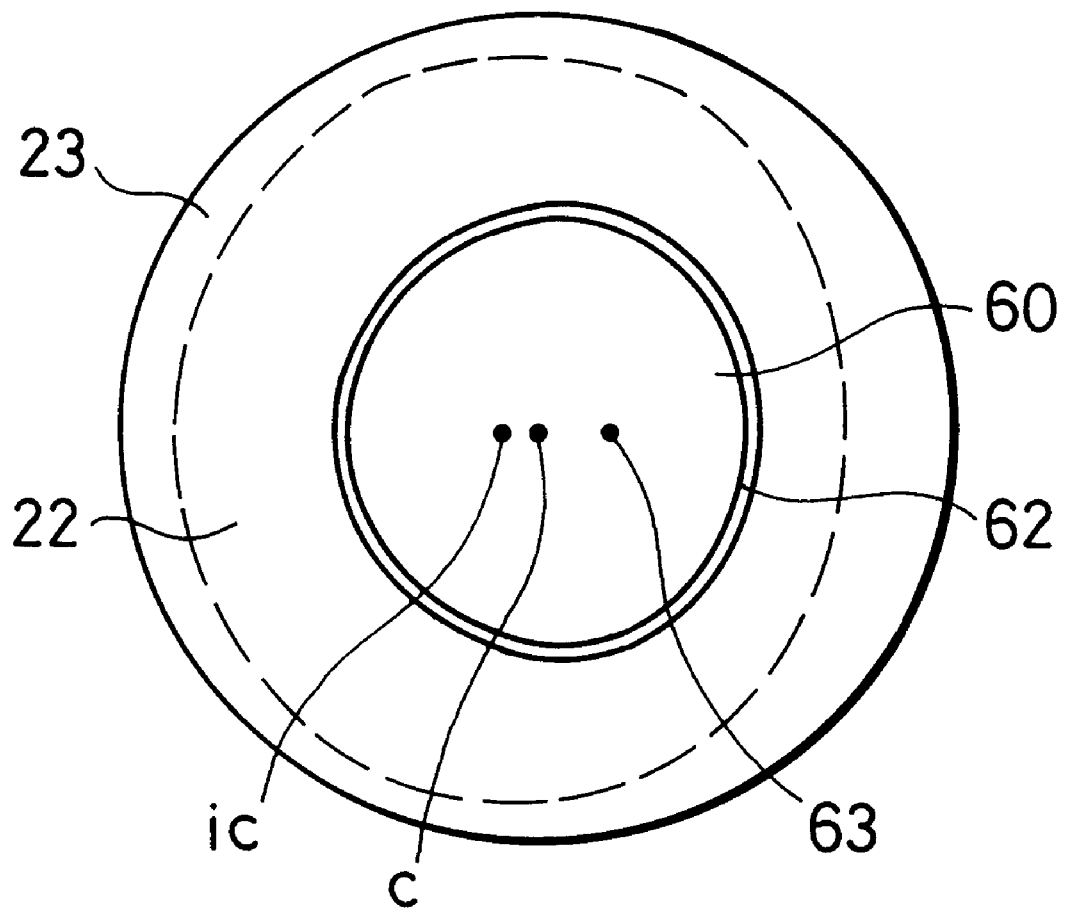
FIG. 5 is a top view of the piston according to a second embodiment of the present invention.

FIG. 4 presents a combustion chamber according to a second embodiment and FIG. 5 is a top view of the piston used for the second embodiment. In these drawings, the description of components having the same numerals as the first embodiment will be omitted because the components have the same functions.

The feature of the combustion chamber according to the second embodiment lies in the configuration of the cavity 60 of the piston 20. The piston cavity 60 according to the second embodiment is composed a spherical surface having a small radius of curvature R1 and a spherical surface having a large radius of curvature R2 provided on the intake valve 40 side and the exhaust valve 41 side, respectively. Further, the ring-shaped protrusion 62 is formed in an approximate oval-shaped circle.

The spherical surface having a small radius of curvature R1 on the intake valve 40 side is denoted a fuel colliding surface 61a and the spherical surface having a large radius of curvature R2 on the exhaust valve 41 side is denoted a fuel guiding surface 61b. The both surfaces 61a, 61b are smoothly connected at the boundary thereof with each other. The centers of the radiuses of curvature R1 and R2 are located at the upward position offset from the center axis ic of the fuel injector 50 on the spark plug 70 side.

The pass length across the oval-shaped protrusion 62 in the direction from the intake valves 40 to the exhaust valves 41 is established to be around 50 percent of a bore d of the cylinder 13. Further, a deepest portion 63 of the cavity 61 is offset on the spark plug 70 side from the cylinder axis c and the depth from the plane portion 23 to the deepest portion 63 is established to be around 15 percent of the bore d of the cylinder 13. The electrode 71 is disposed above the fuel colliding surface 61a, as shown in FIG. 4.

Thus constituted combustion chamber has a capability of concentrating mixture gas in the electrode 71 compared to the first embodiment.

In this embodiment, the cavity 60 is composed of two spherical surfaces having a small and large radius of curvature but alternatively the cavity 60 may be constituted by spherical surfaces having a plurality of radiuses of curvature.

Figure 6:
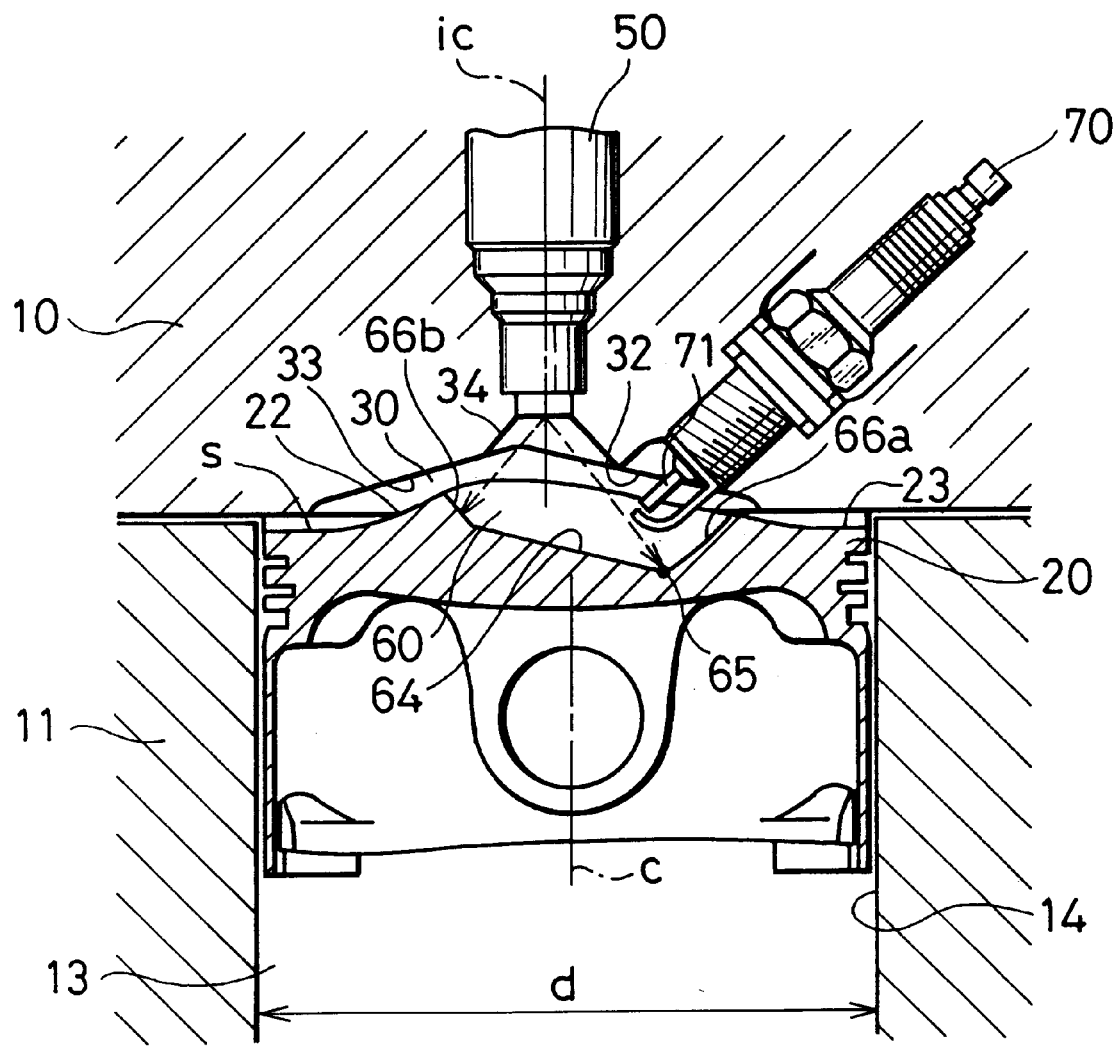
FIG. 6 is a cross-sectional side view of a combustion chamber according to a third embodiment of the present invention.
Figure 7:
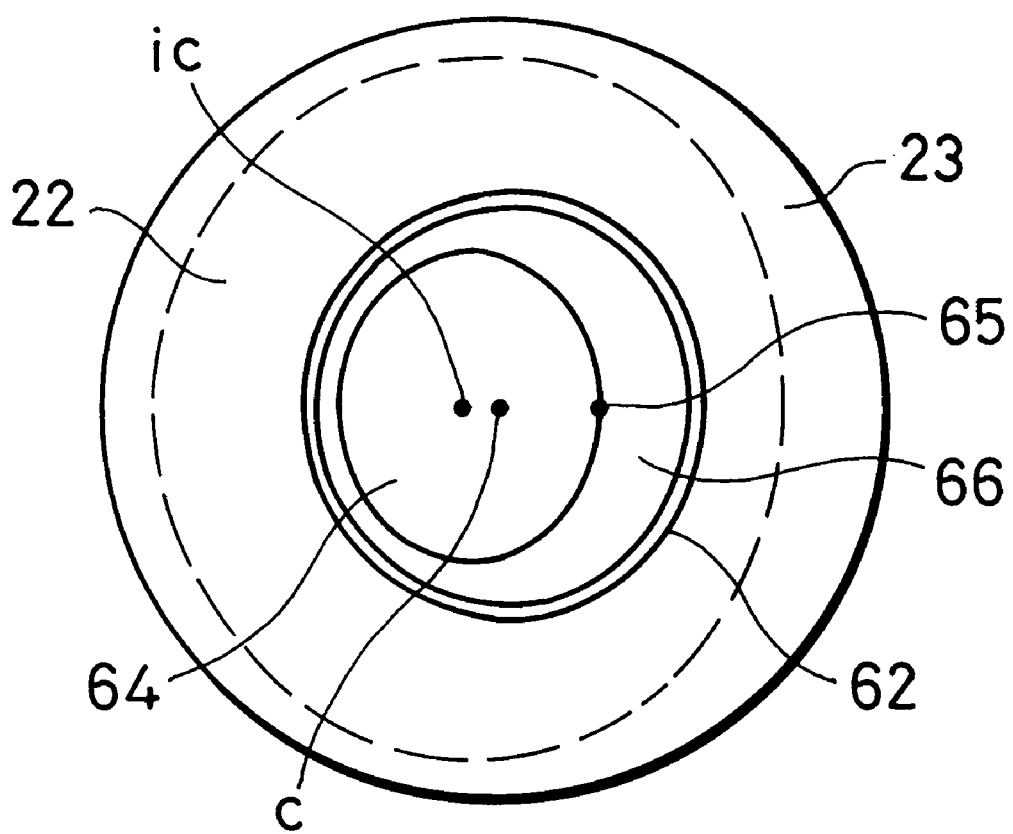
FIG. 7 is a top view of the piston according to a third embodiment of the present invention.

FIG. 6 indicates a combustion chamber according to a third embodiment of the present invention and FIG. 7 is a top view of a piston used for the third embodiment. In these drawings, the description of components having the same numerals as the first embodiment will be omitted because the components have the same functions.

In the combustion chamber, the cavity 60 of the piston 20 is composed of a flat bottom surface 64 which is slanted towards the spark plug 70 side, a bottom edge circle 65 and an edge wall surface 66 which rises from the bottom edge circle 65 at specified angles and encloses the flat bottom surface 64. The ring-shaped protrusion 62 is shaped into an approximate round circle, being offset on the spark plug side.

Further, the slanted bottom surface 64 is also shaped into an approximate round circle as shown in FIG. 7. In this embodiment, the slant angle is established so as to be parallel with the inclined face 32 on the intake valve 40 side within the cross section. Therefore, the slanted bottom surface 64 faces the inclined face 32 almost in parallel. Further, the center of the slanted bottom surface 64 almost agrees with the center axis ic of the fuel injector 50.

The edge wall surface 66 is so constituted as to become wider towards the open end. Further, a wall surface 66a of the edge wall surface 66 on the intake valve 40 side has a different slant angle with respect to the slanted bottom surface 64 from a wall surface 66b of the edge wall surface 66 on the exhaust valve 41 side. Further, the wall surface 66a on the intake valve 40 side is shaped into a curved surface having a large radius of curvature. Further, at the piston position near top dead center the wall surface 66a comes close to the electrode 71.

On the other hand, the wall surface 66b has a cross section shaped in a straight line and its slant angle is established to be approximately orthogonal with respect to the inclined face 33 on the exhaust valve 41 side. Further, the slanted bottom surface 64 is connected with the wall surface 66b through a smooth curved surface.

According to the combustion chamber thus constituted, compared to the first and second embodiments, since the fuel f injected from the fuel injector 50 collides against the flat surface, the mixing of fuel with air is performed more homogeneously and therefore more sophisticated mixture control can be attained.

In this embodiment, although the slanted bottom surface 64 is configured flat, it may be shaped into a spherical surface with a large radius of curvature whose center is located thereabove. Further, the wall surface 66a may be shaped into a straight line in its cross section and similarly the wall surface 66b may be configured in a spherical surface having a large radius of curvature.

In summary, according to the in-cylinder fuel injection engine disclosed in the present invention, when fuel is injected from the fuel injector, the injected fuel collides with a surface slanted towards the spark plug in the cavity provided on the top of the piston and is diffused on the ignition means side. On the other hand, the fuel reflected on the cavity collides with the pentroof type ceiling of the combustion chamber and is diffused therefrom again. The diffused fuel is carried on the tumble flow and the fuel-air mixture gas gathers near the electrode of the spark plug. Thus formed mixture gas is ignited at a specified ignition timing to perform stratified charge combustion.

Hence, according to the present invention, it is possible to make a fine control of the local air-fuel ratio, thereby a good and stable stratified charge combustion can be obtained.

While the presently preferred embodiments of the present invention have been shown and described, it is to be understood that these disclosures are for the purpose of illustration and that various changes and modifications may be made without departing from the scope of the invention as set forth in the appended claim.

What is claimed is:

1. An internal combustion engine having a cylinder, a piston movably disposed in said cylinder for reciprocal motion, a cylinder head, an intake valve disposed in said cylinder head for introducing air into said cylinder and an exhaust valve disposed in said cylinder head for exiting burned gases, comprising:
    a pentroof-shaped combustion chamber provided on a lower surface of said cylinder head and including an inclined face on the intake valve side of the cylinder head and an inclined face on said exhaust valve side;
    a fuel injector disposed in said cylinder head with its injection nozzle oriented downwards so as to inject fuel from upward to downward;
    a spark plug disposed in said cylinder head adjacent to said intake valve side and oriented from said intake valve side to said combustion chamber obliquely with respect to the axis of said cylinder;
    a ring-shaped protrusion provided on the top surface of said piston;
    a concave portion provided inside of said ring-shaped protrusion and offset from the center axis of said fuel injector on said spark plug side; and
    an electrode of said spark plug projected into said concave portion when the piston is almost at top dead center.

2. The internal combustion engine according to claim 1, wherein
    the top surface of said piston is connected with said ring-shaped protrusion through a rising slope whose grade increases as it becomes high.

3. The internal combustion engine according to claim 1, wherein
    said concave portion is shaped into a spherical surface having a single radius of curvature.

4. The internal combustion engine according to claim 3, wherein
    said spherical surface has a center of radius of curvature located at an offset position from the center axis of said fuel injector on said spark plug side.

5. The internal combustion engine according to claim 1, wherein
    said concave portion comprises a small and large spherical surface having a small and large radius of curvature, respectively.

6. The internal combustion engine according to claim 5, wherein
    said small spherical surface is formed on said spark plug side and said large spherical surface is formed on said fuel injector side.

7. The internal combustion engine according to claim 5, wherein
    said small spherical surface has a center of radius of curvature located in an offset position on said spark plug side.

8. The internal combustion engine according to claim 5, wherein
    said large spherical surface has a center of radius of curvature located in an offset position on said spark plug side.

9. The internal combustion engine according to claim 1, wherein
    said concave portion comprises spherical surfaces having a plurality of radiuses of curvature.

10. The internal combustion engine according to claim 1, wherein
    said concave portion comprises a flat bottom surface slanted towards said spark plug side and an edge wall surface rising from said flat bottom surface.

11. The internal combustion engine according to claim 10, wherein
    said flat bottom surface is paralleled with said inclined face on said intake valve side.

* * * * *